April 17, 1956 R. L. WHITELY 2,742,632

MAGNETIC SWITCHING CIRCUIT

Filed Dec. 30, 1954

INVENTOR.
Richard L. Whitely
BY Morris B. Rabkin
ATTORNEY.

United States Patent Office 2,742,632

Patented Apr. 17, 1956

2,742,632

MAGNETIC SWITCHING CIRCUIT

Richard L. Whitely, Haddonfield, N. J., assignor to Radio Corporation of America, a corporation of Delaware Application December 30, 1954, Serial No. 478,581

9 Claims. (Cl. 340—174)

This invention relates to magnetic circuits for performing switching and logical operations, such as those used in information handling systems.

Magnetic systems have been developed that employ magnetic cores made of material having a substantially rectangular hysteresis curve. These magnetic systems have the advantages of small size, relatively small power supply, and relatively long life. Switching circuits are used extensively in information handling systems. These switching circuits include coincidence or "and" gates and inhibit or "but not" gates.

It is among the objects of this invention to provide:

A new and improved magnetic circuit for performing switching and logical operations;

A new and improved switching circuit using magnetic elements as the dynamic circuit components;

A new and improved magnetic gating circuit that is simple and economical.

In accordance with this invention a magnetic switching circuit includes a plurality of magnetic elements each of which has two states of remanence. A winding linked to an input element and windings linked to an output element and to one or more control elements are connected in the same series circuit. The number of turns in the output element and control element windings and the coercive forces of those elements are such that the energizing current in the control element windings necessary to produce magnetizing forces of sufficient magnitude to change the states of the control elements is smaller than the corresponding current in the output element winding. Means are provided for applying magnetizing forces of opposite polarities to the input and control elements to drive them to one and the other of the two stages. As a result, pulses induced in the input element winding produce a change of state of the output element if all of the control elements are in one state, but not if one or more are in the other state.

The foregoing and other objects, the advantages and novel features of this invention, as well as the invention itself both as to its organization and mode of operation, may be best understood from the following description when read in connection with the accompanying drawing, in which like reference numerals refer to like parts, and in which.

Figure 1:
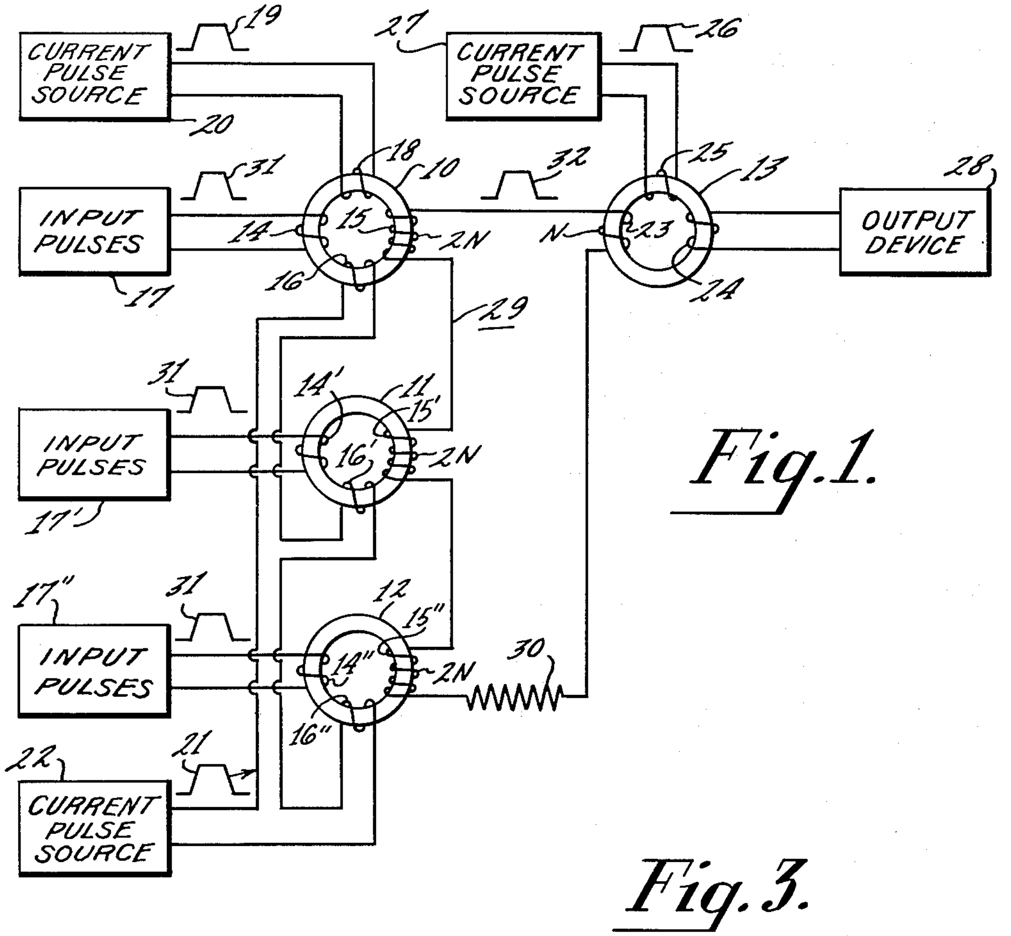
Figure 1 is a schematic circuit diagram of an embodiment of this invention.
Figure 2:
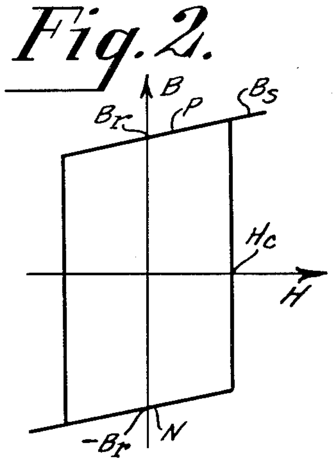
Figure 2 is an idealized graph of the hysteresis curve of magnetic elements used for the magnetic cores in the circuit of Figure 1.

A magnetic "and" gate is shown in Figure 1. Three magnetic cores 10, 11, and 12 receive input signals, and one magnetic core 13 produces output signals. The cores 10 to 13 are preferably made of material having a substantially rectangular hysteresis curve of the type shown in Figure 2. Desirable characteristics of the core material are a high saturation flux density $B_s$, a high residual flux density $B_r$, and a low coercive force $H_c$. For the present, it is assumed that all the cores 10 to 13 have the same coercive force response; that is, a magnetizing force H at least equal to the threshold $H_c$ is required to drive the core from one remanent state to the other. Opposite magnetic states or directions of flux are represented by P and N. The saturation flux density $B_s$ is substantially the same as the residual flux density $B_r$. Therefore, if a magnetizing force in a positive direction is applied to a core which is in the positive state P, essentially no change in the core flux density takes place. Ideally, if the magnetizing force in a flux reversing direction is less than the coercive force $H_c$ the flux density does not change beyond the knee of the curve, and the residual magnetism is substantially unchanged. In practice, the magnetic cores are sufficiently close to the ideal to have two remanent states of substantial stability.

Linked to the first core 10 are an input winding 14, an output winding 15, and a restore winding 16. A source of input pulses 17 is connected to the input winding 14. The second and third cores 11 and 12 are linked by windings similar to those described above for the first core 10. Corresponding numerals are used to reference similar windings on the second and third cores 11 and 12 with the addition of a prime (′) and a double prime (″), respectively. An advance winding 18 is linked to the first core 10 and receives energizing pulses 19 from a current pulse source 20. The restore windings 16, 16′, 16″ are connected in series and receive energizing pulses 21 from a second current pulse source 22. The third core 13 is linked by an input winding 23, an output winding 24, and an advance winding 25. The advance winding 25 receives energizing pulses 26 from a third current pulse source 27. The output winding 24 is connected to an output device 28. The input winding 23 and the output windings 15, 15′, and 15″ are connected in the same series circuit 29, which circuit 29 also includes a resistor 30.

Figure 3:
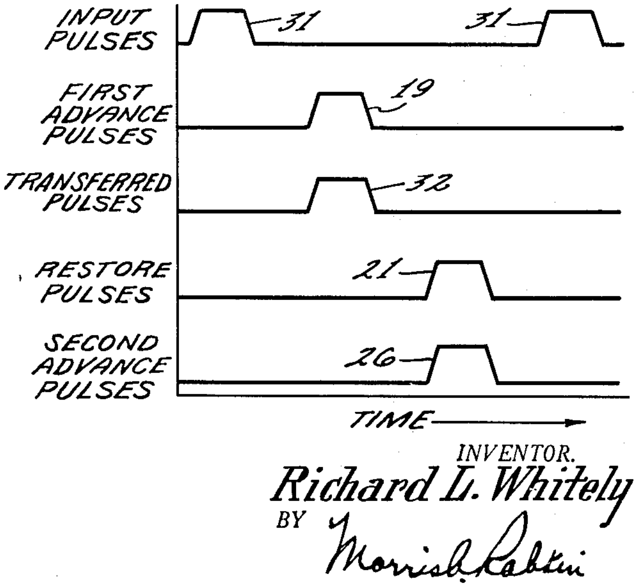
Figure 3 is an idealized graph of the time relationship of waveforms occurring in the circuit of Figure 1.

The time relationships of the pulses supplied by the input pulse sources 17, 17′, and 17″ and the current pulse sources 20, 22, and 27 are shown graphically in Figure 3 for a single cycle. The input pulses 31 are supplied substantially simultaneously from the sources 17, 17′, and 17″. The input pulses 31 are followed by an advance pulse 19 from the source 20, which, in turn, is followed by pulses 21, 26 from the second and third sources 22 and 27 substantially simultaneously. The time synchronization of the pulses shown in Figure 3 may be produced in any appropriate manner such as by a clock pulse generator (not shown). The input pulse sources 17, 17′, and 17″ and the output device 28 may be amplifiers of any desired type. The current pulse sources 20, 22, and 27 may be current generators such as pentodes or the like.

The input windings 14, 14′, 14″ have the same senses of linkage; which is such that positive pulses applied to these windings 14, 14′, 14″ tend to drive the cores 10, 11, 13 to state P. The senses of linkage of the restore and advance windings 16, 16′, 16″, 18 and 25 are such that pulses 19, 21, and 26 from the sources 22, 20, and 27 tend to drive the cores 10 to 13 to state N. The sense of linkage of the first core output winding 15 is such that the pulse induced in that winding 15 when the first core 10 is driven to state N is applied to the second core input winding 23 as a positive pulse. The output windings 15′ and 15″ of the second and third cores 11 and 12 are connected in the series circuit 29 to have the same sense of linkage as the first core output winding 15.

The output windings 15, 15′, 15″ have a substantially larger number of turns than the output core input winding 23; for example, if the input winding 23 has N turns, the output windings 15, 15′, 15″ may have 2N turns. The magnetizing force thresholds NI necessary to reverse the states of the cores 10 to 13 have been assumed to be the same. Therefore, if a current I in the N turns of the input winding 23 is required to reverse the state of the output core 13, a current $$\frac{I}{2}$$

in the second and third core output windings 15′ and 15″ is sufficient to reverse the state of those cores 11 and 12. The dimensions of the second, third, and fourth cores 11 to 13 are also assumed to be the same.

The cores 10 to 13 may be considered to be initially in state N. In the absence of input pulses 31, the input cores 10 to 12 remain in state N. The first advance pulse 19 applied to the winding 18 tends to drive the first core 10 further into state N. The resulting voltage induced in the output winding 15 is negligible. Similarly, the restore pulse 21 applied to the windings 16, 16′, 16″, and the advance pulse 26 applied to the winding 25 have negligible effects.

If the input pulses 31 are supplied simultaneously to the windings 14, 14′, 14″ the input cores 10 to 12 are all driven to state P. The voltages induced in the output windings 15, 15′, 15″ at this time are all in a direction to drive the output core 13 further to saturation in state N and, therefore, have a negligible effect on that core 13. The series circuit resistor 30 limits the current due to the voltages induced in the output windings 15, 15′, 15″. The next advance pulse 19 applied to the winding 18 drives the first core 10 back to state N. The pulse 32 induced in the output winding 15 is of sufficient amplitude and of the proper polarity to drive the output core 13 to state P. The direction of the current flow in the series circuit is such as to drive the second and third cores 11 and 12 further to saturation in state P. Thus, the first advance pulse 19 results in the transfer of the state of the first core 10 to the output core 13.

The second advance pulse 26 returns the output core 13 to state N inducing a pulse in the output winding 24, which is applied to the output device 28. At the same time, current pulses 21 are applied to the restore windings 16, 16′, 16″ to return the second and third cores 11 and 12 to state N. The amplitude of the second advance pulse 26 is sufficient to drive the output core 13 to state N notwithstanding the opposing currents in the series circuit 29 resulting from the return of the second and third cores 11 and 12 to state N. The restore pulse 21 applied to the first core winding 16 opposes the current in the series circuit 29 that tends to drive the first core 10 to state P. The resistor 30 provides the required impedance for the voltages induced in the windings 15′, 15″, and 23. The number of turns in the winding 15 is greater than that of winding 23 to insure that the amplitude of the pulse induced in the winding 15 is sufficient to change the state of the fourth core 13 notwithstanding the voltage drop across the resistor 30.

Thus, if input pulses 31 are supplied to all the input cores 10, 11, and 12, a pulse 32 is transferred to the fourth core 13, which results in an output pulse to the output device 28. At this time, all the cores 10 to 13 are in the initial state N, and a new cycle is started.

If the second and third cores 11 and 12 receive input pulses 31 but the first core 10 does not, the first advance pulse 19 has no effect on the first core 10. Thus, a pulse is not transferred to the fourth core 13, and that core 13 remains in state N. The second advance pulse 26 does not change the state of the fourth core 13, and, therefore, no output pulse is produced. At the same time, the second and third cores 11 and 12 are restored to state N by the restore pulse 21. There is no effect on the first and fourth cores 10 and 13 during this restoration due to the opposing action of the second advance pulse 26 in the winding 25 and the restore pulse 21 in the winding 16, as explained above.

The situation considered next is that of input pulses 31 being supplied to the first and third cores 10 and 12, but not to the second core 11. The current in the series circuit 29 due to the voltage induced in the first core output winding 15 by the next advance pulse 19 is in the direction to turn the second core 11 to state P. The second core 11 starts to change its state from N to P in response to a smaller magnetizing current than required by the fourth core 13. During the time that the second core 11 is changing from N towards P and is traveling along the vertical portion of the hysteresis curve, the current in the series circuit is limited to one-half that needed by the fourth core input winding 23 to turn over that core 13. Therefore, during that time the core 13 remains in state N. The duration of the induced pulse in the winding 15 is such that the available volt-microseconds are used in changing the state of the second core 11, and the fourth core 13 remains substantially unaffected in state N. Thus, the second core effectively inhibits a transfer of a pulse 32 to the fourth core 13. The second advance pulse 26 has no effect on the fourth core 13, and no output pulse is produced. The input cores 10 to 13 are restored to state N in the manner described above.

In a similar manner, if the third core 12 does not receive an input pulse, or if both the second and third cores 11 and 12 do not receive input pulses, the transfer of a pulse from the first core 10 to the fourth core 13 is effectively inhibited. This inhibiting action takes place even though the voltage induced in the winding 15 is not sufficient to drive both the second and third cores 11 and 12 to state P. It is sufficient that, for the duration of the induced pulse 32, the current in the circuit 29 is limited to $$\frac{I}{2}$$

Thus, it is seen that an output pulse is produced if all three input cores 10 to 12 receive pulses, but not if any one or more do not receive input pulses.

In an alternative construction the windings 15′, 15″, and 23 may have the same number of turns, but the cores 11 and 12 would then have a smaller diameter than the core 13. As a result, a smaller magnetizing current is required to change the state of the smaller core.

It has been assumed that the coercive forces of the cores 11, 12, and 13 are the same, and the number of winding turns or the core diameters are different to provide different critical values of energizing current for the windings in the series circuit 29. Alternatively, the number of winding turns may be the same, and cores of different materials may be employed to provide different coercive forces; the coercive forces of the cores 11 and 12 being less than that of the core 13.

The gating circuit of Figure 1 may be constructed with as many or as few input cores 10 to 12 as desired. As described, the cores 10 to 12 receive input signals which may be representative of binary information. The circuit may also be operated with input pulses applied only to the first core 10, and control pulses applied to the second and third cores 11 and 12. Such control pulses (or the absence thereof) would enable (or inhibit) the transfer of pulses from the first core winding 15 to the second core winding 23 in the manner described above.

A diode (not shown) may be connected in the series circuit 29. Such a diode would be poled to block current flow in the circuit 29 when the input pulses 31 are applied to the windings 14, 14′, and 14″. This diode would not affect current flow in the opposite direction resulting from the first core being driven back to state N. This diode would permit a reduction in the size of the resistor 30.

Thus, by means of this invention, an improved and simple magnetic circuit is provided for performing switching and logical operations. The circuit is simple and economical and may be employed as a coincidence or an inhibit gate.

What is claimed is:

1. A magnetic switching circuit comprising a first, a second, and a third magnetic element each having two magnetic states, said elements changing from one of said states to the other in response to predetermined magnetizing forces, windings linked to each of said elements, means connecting said windings in the same series circuit, said predetermined magnetizing forces and the number of turns in said second and third element windings being such that the energizing current in said second element winding necessary to produce said predetermined magnetizing force for said second element is smaller than the energizing current in said third element winding necessary to produce said predetermined magnetizing force for said third element, and means for applying magnetizing forces of opposite polarities to said first and second elements to drive them to one and another of said states, the sense of linkage of said windings being such that a pulse induced in said first element winding upon said first element being driven to one of said states tends to produce a change of state of said third element if said second element is in one of said states and not if in the other of said states.

2. A magnetic switching circuit as recited in claim 1 wherein said predetermined magnetizing forces are the same, and the number of turns in said second element winding is greater than the number of turns in said third element winding.

3. A magnetic switching circuit as recited in claim 1 wherein said means for applying magnetizing forces of opposite polarities to said first and second elements includes separate first windings linked to said first and second elements, separate second windings linked to said first and second elements, and means for respectively applying pulses of opposite polarities to said first and second windings.

4. A magnetic switching circuit as recited in claim 1 wherein said series circuit further includes an impedance element.

5. A magnetic switching circuit comprising a first, a second, and a third magnetic element each having two magnetic states, said elements changing from an initial one of said states to the other in response to predetermimned magnetizing forces, windings linked to each of said elements, means connecting said windings in the same series circuit, said predetermined magnetizing forces and the number of turns in said second and third element windings being such that the energizing current in said second element winding necessary to produce said second element magnetizing force is smaller than the energizing current in said third element winding necessary to produce said third element magnetizing force, and means for applying magnetizing forces of opposite polarities to said first and second elements to drive them to said initial and other states, the sense of linkage of said windings being such that pulses induced in said first element winding upon said first element being driven to said initial state tend to drive said second and third elements to said other state.

6. A magnetic gating circuit comprising an input, an output, and a plurality of control magnetic elements, each of said elements having two magnetic states and changing from one of said states to the other in response to a predetermined magnetizing force, windings linked to each of said elements, means connecting said windings in the same series circuit, said predetermined magnetizing forces and the number of turns in said output and control element windings being such that smaller and larger energizing currents in said control and output element windings are necessary to produce said predetermined magnetizing forces for said control and output elements respectively, and means for applying magnetizing forces of opposite polarities to said input and control elements, whereby a pulse induced in said input element winding tends to produce a change of state of said output element if all of said control elements are in one of said states but not if at least one of said control elements in the other of said states.

7. A magnetic gating circuit as recited in claim 6 wherein said predetermined magnetizing forces for said output and control elements are the same, and the number of turns in said control element windings is greater than the number of turns in said output element windings.

8. A magnetic switching circuit comprising a first, a second, and a third magnetic element each having two magnetic states, said elements changing from one to the other of said states in response to predetermind magnetizing forces, first and second windings linked to each of said elements, means connecting said first and second element second windings and said third element first winding in the same series circuit, said predetermined magnetizing forces and the number of turns in said second element second winding and said third element first winding being such that the energizing current in said second element second winding necessary to produce said second element magnitizing force is smaller than the energizing current in said third element first winding necessary to produce said third element magnetizing force, means for applying to said first and second element first winding pulses of polarity tending to drive said first and second elements to said one state, and means for applying magnetizing forces to said elements in a direction tending to drive said elements to said other state, the senses of linkage of said series circuit windings being such that pulses induced in said first element second winding upon being driven to said other state tend to drive said second and third elements to said first state.

9. A magnetic gating circuit comprising a plurality of input magnetic elements, an output magnetic element, each of said elements having two magnetic states and changing from one to the other of said states in response to the same predetermined magnetizing force, separate input, output, and restore windings linked to each of said input elements, an advance winding linked to a first one of said input elements, input, output, and advance windings linked to said output element, said input element output windings have a greater number of turns than said output element input winding, a resistance connected in a single series circuit with said input element output windings and said output element input windings, means for simultaneously applying input pulses to said input element input windings to drive said input elements to a first one of said states, means for applying advance pulses to said first input element advance winding to drive said first input element to a second one of said states, means for simultaneously applying pulses to said restore windings and to said output element advance winding to drive said elements to said second state, the senses of linkage of said series circuit windings being such that pulses induced in said first input element output winding upon being driven to said second state tend to drive the others of said elements to said first state.

References Cited in the file of this patent

UNITED STATES PATENTS 2,695,993 Haynes -------------- Nov. 30, 1954